April 10, 1956 R. M. M. OBERMAN 2,741,664

INTERCONNECTING OF SUBSCRIBERS' LINES IN FINAL SELECTORS

Filed Oct. 24, 1952 6 Sheets-Sheet 1

INVENTOR:
R.M.M. OBERMAN.
BY Hugh A. Kirk
ATTY.

INVENTOR:
R.M.M. OBERMAN.
BY Hugh A Kirk
ATTY.

INTERCONNECTING OF SUBSCRIBERS' LINES IN FINAL SELECTORS

Filed Oct. 24, 1952 6 Sheets-Sheet 3

INVENTOR:
R. M. M. OBERMAN.
BY Hugh A Kirk
ATTY

INVENTOR:
R. M. M. OBERMAN.
BY
Hugh A. Kirk
ATTY.

April 10, 1956 R. M. M. OBERMAN 2,741,664

INTERCONNECTING OF SUBSCRIBERS' LINES IN FINAL SELECTORS

Filed Oct. 24, 1952 6 Sheets-Sheet 5

INVENTOR:
R. M. M. OBERMAN.
BY Hugh A. Kirk
ATTY.

INTERCONNECTING OF SUBSCRIBERS' LINES IN FINAL SELECTORS.

Filed Oct. 24, 1952 6 Sheets-Sheet 6

INVENTOR:
R. M. M. OBERMAN.
BY Hugh A. Kirk
ATTY.

United States Patent Office 2,741,664

Patented Apr. 10, 1956

2,741,664

INTERCONNECTING OF SUBSCRIBERS' LINES IN FINAL SELECTORS

Roelof Maarten Marie Oberman, The Hague, Netherlands, assignor to De Staat der Nederlanden, Ten Deze Vertegenwoordigd Door de Directeur-Generaal der Posterijen, Telegraphie en Telefonie, The Hague, Netherlands Application October 24, 1952, Serial No. 316,573

12 Claims. (Cl. 179—18)

Figure 1A:
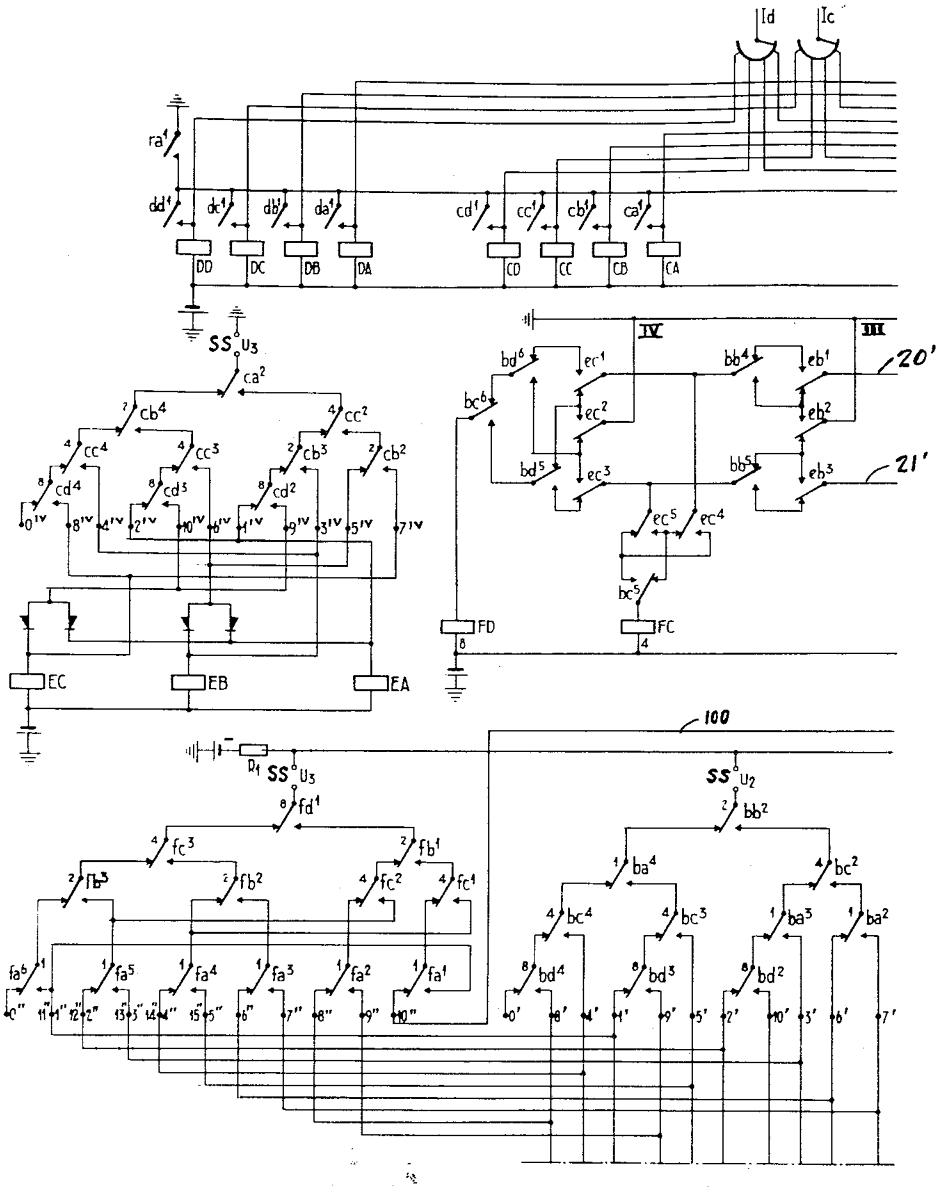
Figure 1A:
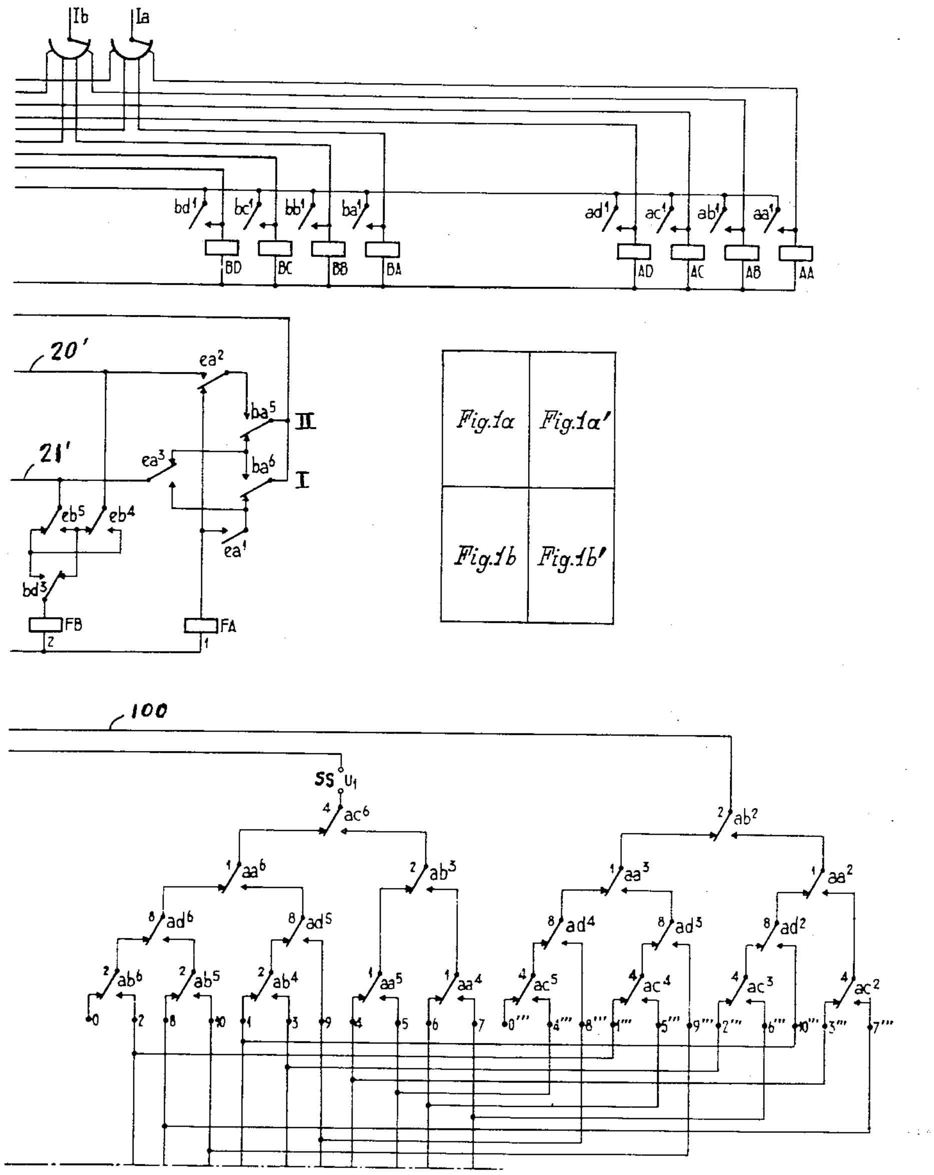

The use of 200-point final selectors, which can be considered as two 100-point selectors which are driven e. g. by the same driving mechanism and between which a discrimination can be made by means of a change-over relay, offers the possibility of a simple interconnection to be effected between the subscribers' lines of the various hundreds groups. Such change-over relays are known from the Siemens 17 System (see page 646 and Fig. 396 in "Telephony" by T. E. Herbert and W. S. Proctor, vol. II (1939), published by Sir Isaac Pitman and Sons, Ltd., London). The said simple interconnecting is obtained as follows:

The subscribers' lines of the tenth "0" hundreds group (interconnecting path) and of the first "1" hundreds group (main path) of a thousands group are connected to the group of final selectors which can be reached or connected via the first group of outlets of the just preceding selector stage or last group selector stage. The first hundreds "1" group (interconnecting path) and the second "2" hundreds group (main path), also occurring in one group of final selectors, can be reached via the second group of outlets of the last group selector stage; the second "2" hundreds group (interconnecting path) and the third "3" hundreds group (main path), occurring together in the next "4" group of final selectors, are reached via the third group of outlets of the last group selecting stage, etc. The 200-point final selectors, in this case, have two so-called *c*-wire level of inlets, viz. a normal one via which one hundreds group of subscribers' circuits is reached (main path), and the interconnecting inlet via which the other hundreds group of subscribers' lines is reached. The above-mentioned change-over relay of a final selector is energized, when the selector is seized via the interconnecting inlet. Consequently, the last group selector, when being positioned in the desired level, first hunts over a number of outlets via which a final selector may be seized in the normal way. If all these outlets are busy said group selector goes on hunting in the next level or line group, but via another wiper, so that the final selectors which normally correspond to the hundred group which is next in number, can be seized via the interconnecting inlet.

The effect of this interconnecting, however, is only small, as the interconnecting is rather imperfect. A better interconnecting has not yet been achieved so far with final selectors and it seems that in the existing direct and register-controlled systems it is not easily possible. It has been shown from the use of 200-point line finders that a better interconnecting between several hundreds groups results in an appreciable economy in the numbers of selectors. If e. g. a hundreds group is divided into two groups of forty and one group of twenty circuits, these groups being connected to the interconnecting part of the 200-point line finders, which numerically belong to other hundred groups, it can be shown that with an equal number of apparati per hundreds group, the grade of service rises from about 0.01 to 0.001 interfering probability; or the number of final selectors in each group may be reduced for a given amount of traffic. This means that a good interconnecting is highly desirable for final selectors as well. Regard being had to certain rules it is possible to carry out a more extensive interconnecting in the final selector stage in automatic switching systems arranged according to a trunking diagram as described in the co-pending prior U. S. patent application of Oberman, No. 300,806, now U. S. Patent No. 2,711,444, issued June 21, 1955. The fact is that in the systems according to this patent, a register can make a busy test on all the final selectors of every hundreds group. As a result of this it will also be possible to connect subscribers' line groups belonging, numerically, to certain hundreds groups to the interconnecting part of final selectors belonging, numerically, to other hundreds groups. But it is essential in that case, that the circuits concerned in the interconnecting can be found back in a systematic way.

A generally useful way of interconnecting is the following, which, according to the desired degree of interconnecting, can be carried out with groups of 10, 25 or 50 subscribers' lines. Of a certain hundreds group the first group of 10 (20, 25 or 50) circuits may be located on the first 10 (20, 25 or 50) positions in the interconnecting part (second hundreds group) of the final selectors for the numerically next hundreds group; the second group of 10 (20, 25 or 50) circuits to the interconnecting part of the final selectors for the following hundreds group which is second in succession, etc.

It is also possible to keep, by means of cyclic permutation over the final selectors of a certain number of hundreds groups, the location of the interconnecting groups confined to a closed group. In certain cases this may be desired for reasons of practical installation. Table A shows an example of an interconnecting scheme for six selectors (1–6) of a group of one hundred 200-point selectors for a 10,000 line exchange provided with interconnecting groups of 20 subscribers' lines in systematic shifting. Table B gives a similar interconnecting diagram. In this case, however, the interconnecting, by virtue of cyclic permutation, is contained within a group of 600 circuits of six 200-point selector switches (1–6).

TABLE A.—SCHEMATIC SHIFTING

| 1 | | 2 | | 3 | | 4 | | 5 | | 6 | |
|---|---|---|---|---|---|---|---|---|---|---|---|
| A20 | --- | B20 | A20 | C20 | B20 | D20 | C20 | E20 | D20 | F20 | E20 |
| A40 | --- | B40 | --- | C40 | A40 | D40 | B40 | E40 | C40 | F40 | D40 |
| A60 | --- | B60 | --- | C60 | --- | D60 | A60 | E60 | B60 | F60 | C60 |
| A80 | --- | B80 | --- | C80 | --- | D80 | -- | E80 | A80 | F80 | B80 |
| A00 | --- | B00 | --- | C00 | --- | D00 | -- | E00 | -- | F00 | A00 |

TABLE B.—CYCLIC PERMUTATION

| 1 | | 2 | | 3 | | 4 | | 5 | | 6 | |
|---|---|---|---|---|---|---|---|---|---|---|---|
| A20 | F20 | B20 | A20 | C20 | B20 | D20 | C20 | E20 | D20 | F20 | E20 |
| A40 | E40 | B40 | F40 | C40 | A40 | D40 | B40 | E40 | C40 | F40 | D40 |
| A60 | D60 | B60 | E60 | C60 | F60 | D60 | A60 | E60 | B60 | F60 | C60 |
| A80 | C80 | B80 | D80 | C80 | E80 | D80 | F80 | E80 | A80 | F80 | B80 |
| A00 | B00 | B00 | C00 | C00 | D00 | D00 | E00 | E00 | F00 | F00 | A00 |

Each final selector group (1–6) in these tables is indicated by two columns. The left-hand column contains 5 groups of 20 circuits of the normal numbering scheme, the right-hand column indicates the place where the interconnecting groups are located. An interconnecting group in Table A can be found in the interconnecting part of the final selectors of the $n^{th}$ hundred group following the hundred group in which these connections occur normally in the numbering scheme, $n=5$ being the number of the sub-groups (each having 20 subscribers) the hundreds groups are divided into.

An interconnecting group of a hundreds group of outlets, in the system according to Table B is located by cyclic permutation in the $(n+1)^{th}$ hundreds group. With interconnecting groups of 10 outlets, the cyclic permutation of the interconnecting groups covers $10+1=11$ hundreds groups, with interconnecting groups of 50 outlets it takes only $(2+1)$ three hundreds groups.

The interconnecting can be carried out, of course, with unequal groups, e. g. of 40, 40 and 20 connections as well, but this renders it more difficult to find the interconnecting groups.

The interconnecting of final selector outlets according to Table A, in an automatic switching system arranged according to a trunking diagram as described in the said Patent No. 2,711,444, can be effected in the following way.

The busy test selector BZ (in said prior patent) of a register is positioned in accordance with the first two digits of the subscriber's number, which, in the said patent, has been supposed to consist of four digits. The busy test selector BZ enables the register to carry out, via one of its wipers for the desired hundreds group and the other wipers individually, a busy test on a final selector circuit and, if necessary, to mark it as engaged. If in this position of the busy test selector BZ, a free final selector is found, the call is completed via the normal numerical path. If, however, there is no free final selector available, the hundreds group (of outlets of the final selector) in which the desired subscribers' lines occur as interconnecting outlets, can be made accessible to the register by moving the busy test selector.

Therefore the register must be equipped with a device which records the number of the interconnecting group in the relevant hundreds group. Consequently, this number must be derived from the last two digits of the received subscriber's number and according to this number, the busy test selector must be re-positioned. As one embodiment and method of this principle, the summation will be considered herein. In this case the busy test selector should be re-positioned in accordance with the sum of the number of the interconnecting group and the number of the chosen hundreds group (similar to the arrangement shown in Table A above).

By way of an example an arrangement will be described, which allows the re-positioning of the busy test selector in a register as used in the system according to the said Patent No. 2,711,444. It is assumed in this case that the digits of the called subscriber's number are recorded in the binary code and that the interconnecting groups comprise 20 subscribers' lines. From the circuits to be described the switching engineer can readily derive circuits for interconnecting groups of other sizes and even for differently sized interconnecting groups.

Figure 1B:
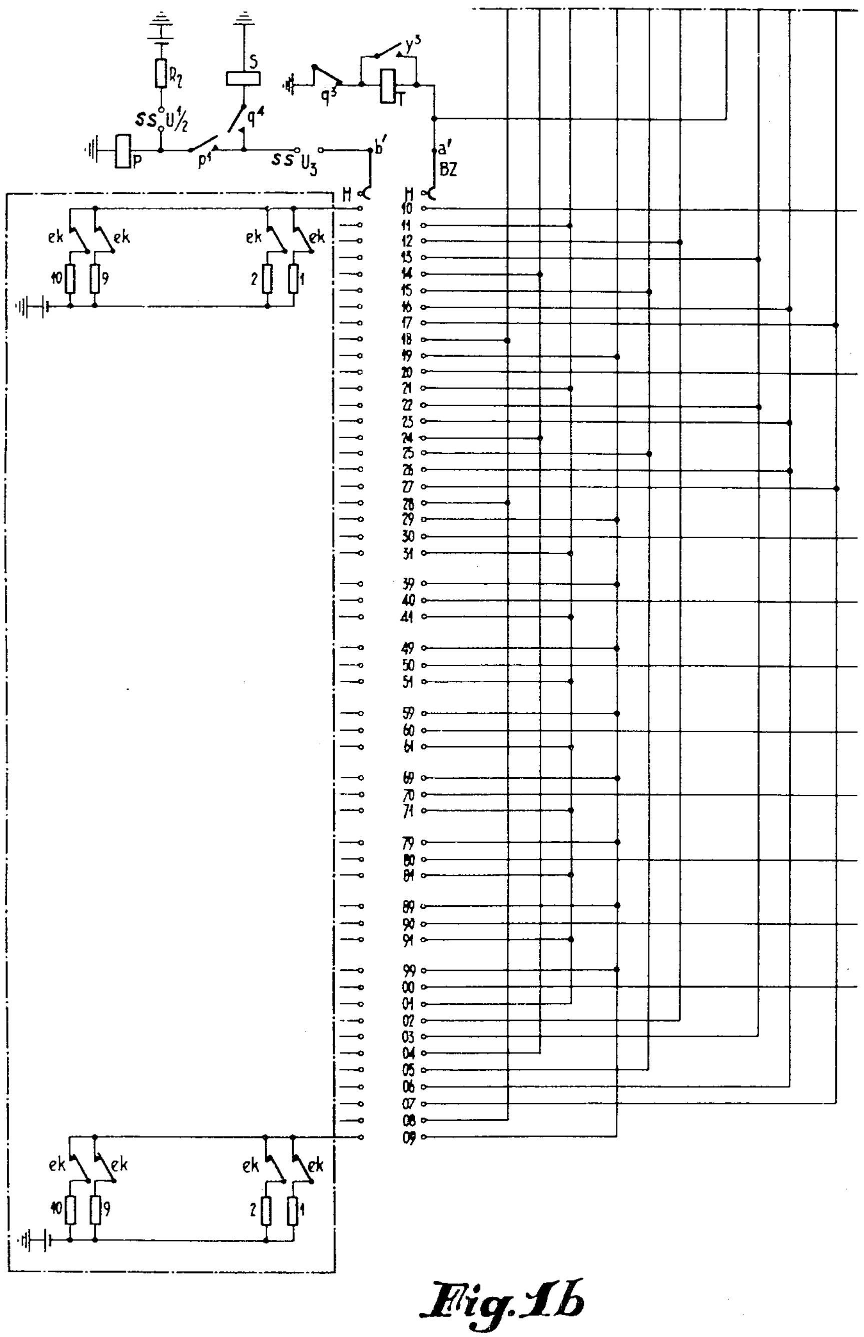
Figure 1B:
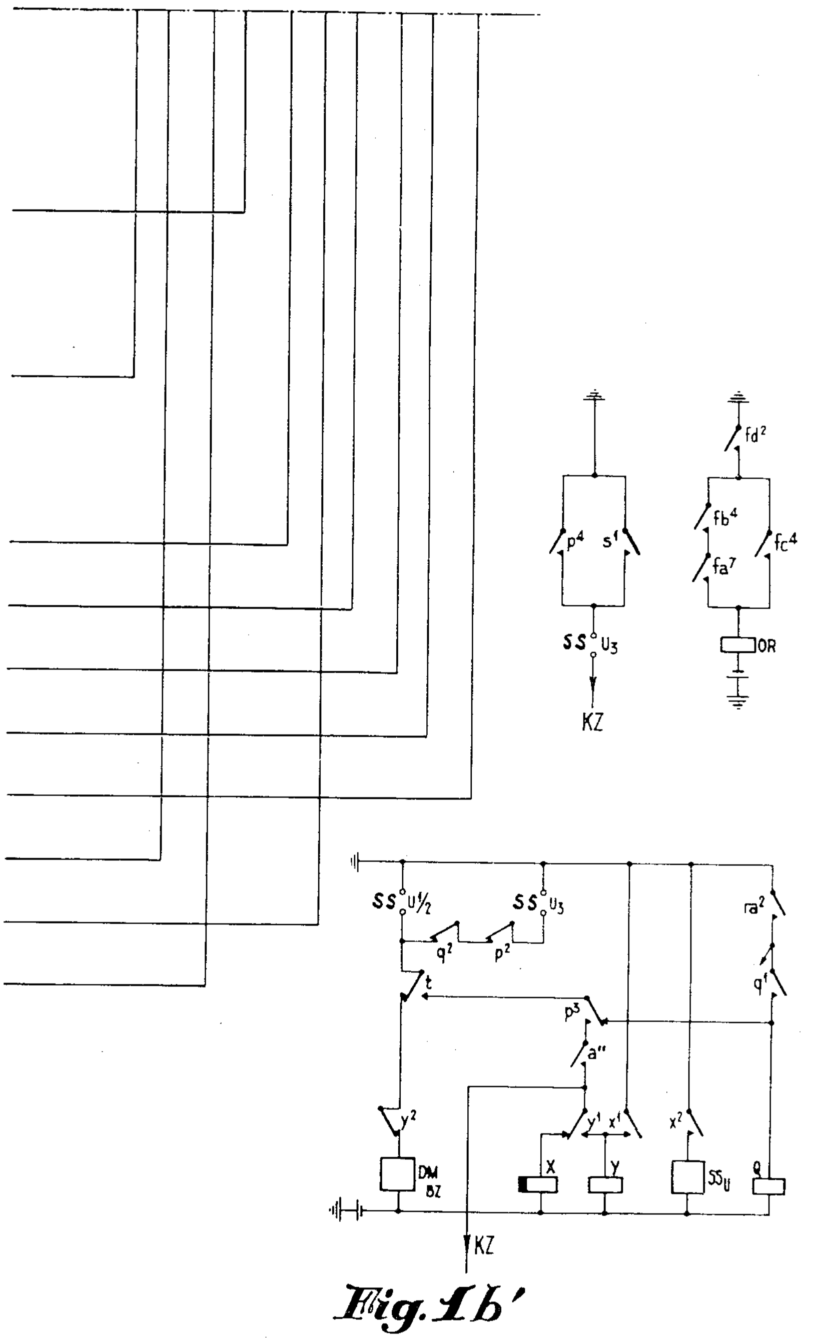
Figure 2:
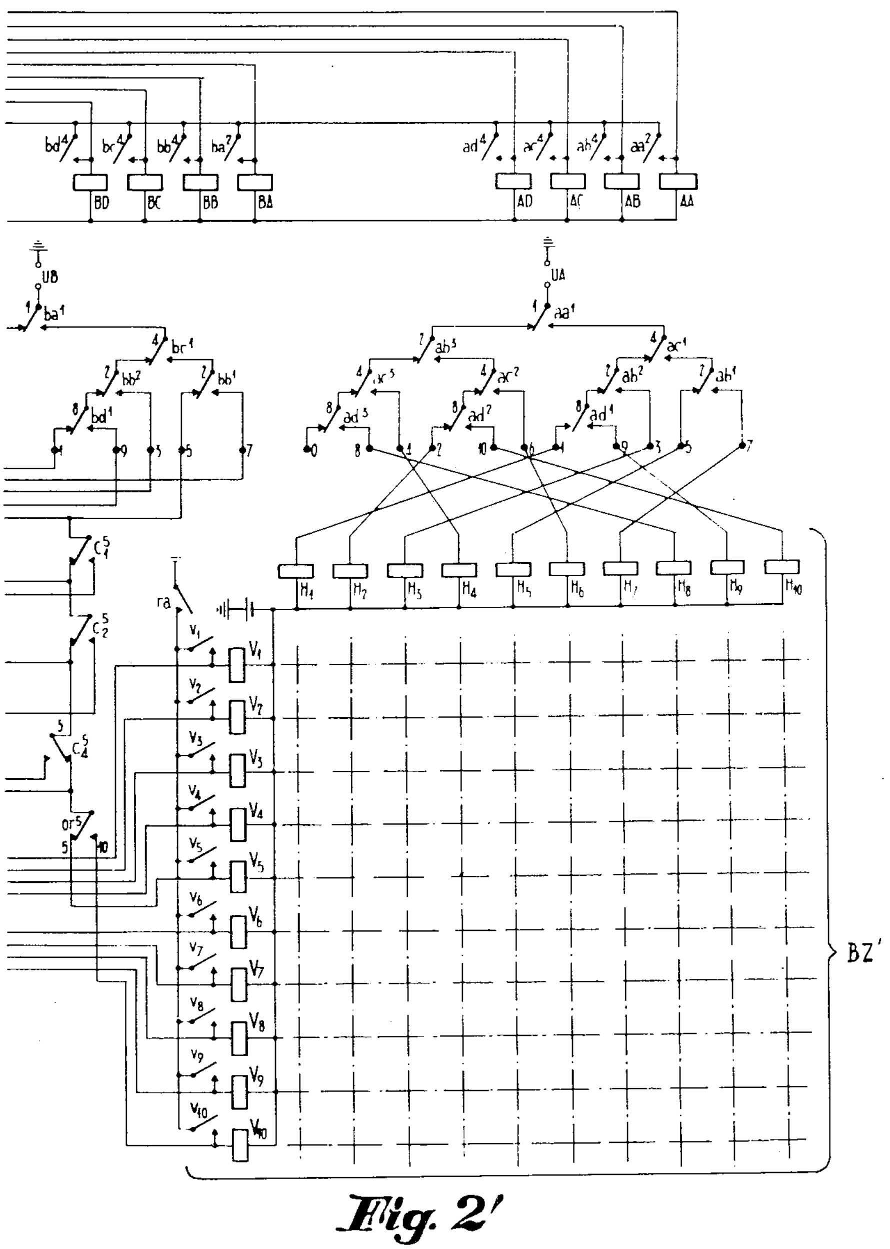
Figures 2, 3:
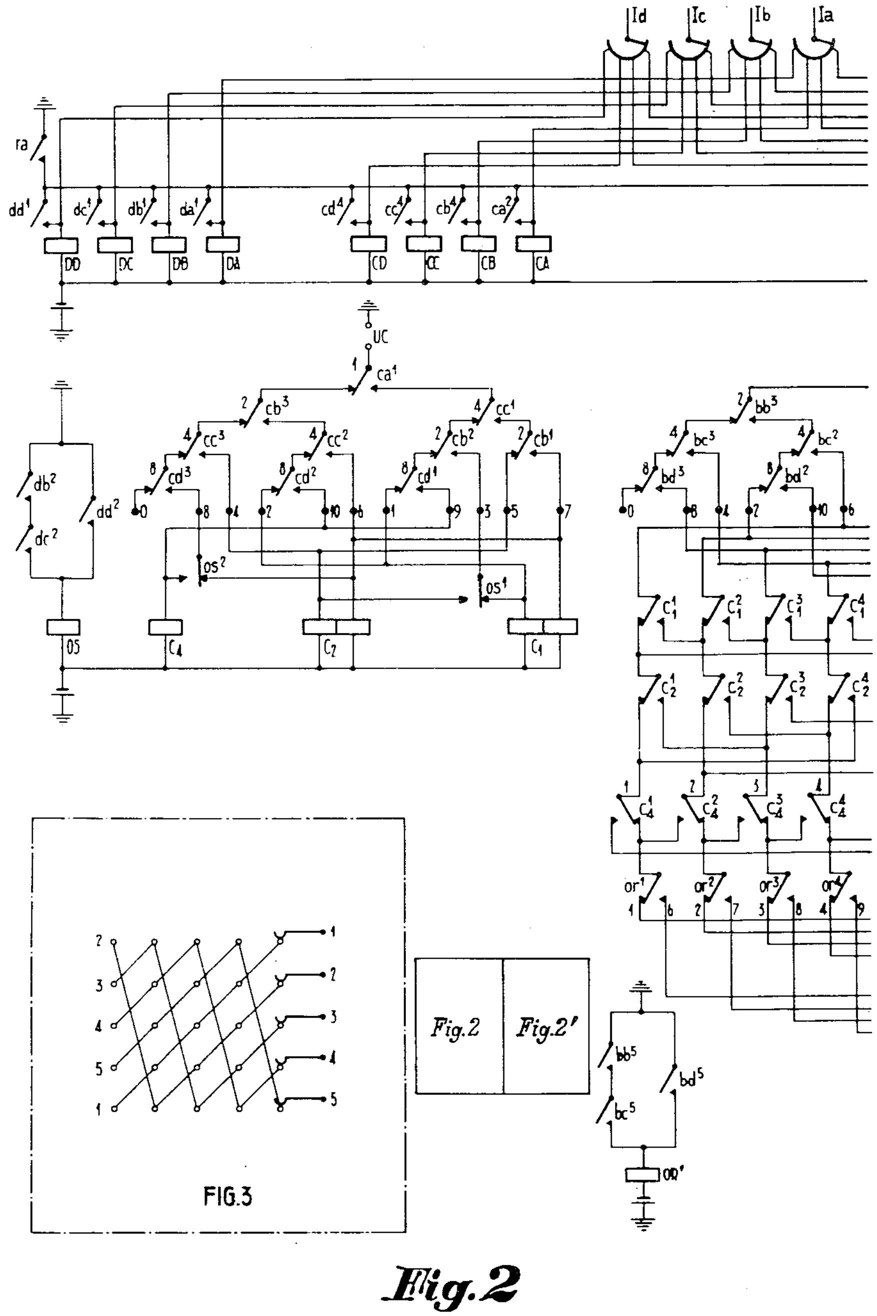

The above mentioned and other features and objects of this invention and the manner of attaining them are given more specific disclosure in the following description of embodiments of the invention taken in conjunction with the accompanying drawings, wherein:

Figs. 1*a* and 1*b* together comprise a schematic wiring diagram of one embodiment of the invention adapted to a four digit decimal system for preselecting a free and available final selector in which the outlets have been interconnected according to schematic shifting as shown in Table A above;

Fig. 2 is a schematic wiring diagram of another embodiment of this invention showing the way in which a subscriber line is determined by interconnecting according to cyclic permutation as shown in Table B for interconnecting groups of 25 subscribers' lines and adapted for use with a crossbar type of busy test selector switch; and Fig. 3 is a schematic symbolic showing of how the outlet contacts of a small rotary selector switch may be connected and contacted by its wipers for effecting a cyclic shift.

The circuit according to Fig. 1 shows the control of a busy test selector BZ (see left side of Fig. 1*b*) in the register of an automatic switching system according to said Patent No. 2,711,444. The register shown is arranged for an automatic switching system with a 4-digit numbering scheme. The principles indicated, however, also apply to systems with other numbering schemes. In Fig. 1*a* (at the top) four arcs of an incoming sequence switch I have been shown and connected to them four groups of four register relays, which ensure a binary registration of the selecting criteria received. These groups of register relays are designated from right to left by AA to AD, BA to BD, CA to CD and DA to DD. The positioning of the busy test selector BZ of the register can be effected in various ways, e. g. by means of a so-called comparison system. For simplicity's sake a normal tens and units marking has been chosen in Figs. 1*a* and 1*b* for the positioning of the busy test selector BZ. This necessitates the provision of a contact pyramid of the group of relays AA—AD for the thousands digit, that is, the tens marking of the busy test selector BZ, and of the group of relays BA—BD for the hundreds digit, that is the units marking of the busy test selector BZ, each contact pyramid having eleven terminals and ten outlets 1–10, 1'–10'. The outlets 1–10 of the first contact pyramid are symmetrically connected to the tens contacts (H10, H20, H30, H40, . . . H00) of the marking arc *a'* of the busy test selector BZ shown along the left side of Fig. 1*b*. The first nine outlets 1'–9' of the second contact pyramid of relays BA—BD are symmetrically connected to the nine units contacts within each pair of tens contacts of the marking arc *a'* of the busy test selector BZ.

The arc *a'* of the busy test selector is connected to a test relay T for hunting the marked contact. The positioning of the busy test selector is controlled by a sequence switch SSU (lower right of Fig. 1*b*) and said test relay T (upper left of Fig. 1*b*). As it is possible that all numerical outlets of the wanted subscriber are busy, it is necessary to locate the outlets to the wanted subscriber through the interconnections of the present system. In the system according to Figs. 1*a* and 1*b* it has been assumed the interconnections have been carried out with groups of twenty subscribers' lines and is of a schematic forward shifting type as has been disclosed in Table A above. As the $n^{th}$ interconnecting group can be found in the interconnecting part of the final selectors of the $n^{th}$ hundredth group following the hundred group in which these connections occur numerically, the number $n$ of the interconnecting group has to be determined which depends on the tens digit. This is performed by a third contact pyramid of the relays CA—CD for the tens digit controlling relays EA—EC which register in the binary code. The interconnections can now be found back by adding the group number to the hundreds digit which is controlled by the adding arrangement consisting of contacts of the relays BA—BD, namely hundreds digit, and of the relays EA—EC for controlling relays FA—FD. The relays FA—FD control a fourth contact pyramid for marking the contacts of the busy test selector BZ corresponding to the hundreds group of final selectors in which the desired interconnecting group occurs. As the sum of the number of the group and the hundreds digit may be ten, it is necessary to have another tens marking for the busy test selector BZ which is accomplished by the additional or fifth contact pyramid having outlet terminals 0''' to 10''' on the group of relays AA—AD, the top of which pyramid has been connected to conductor 100 to the outlet 10'' of the third contact pyramid on the group of relays FA—FD.

For the discussion of the operation of the system according to Figs. 1*a* and 1*b*, it will be assumed that the called subscriber's number is "1674" for the further description of the circuits described below.

*Numerical positioning of BZ and the busy test of the desired hundreds group of final selectors*

The first digit "1" of the subscriber's number is registered by the group of relays AA—AD by the energization of relay AA which closes a holding circuit to the register ground contact *ra*1 by means of its contact *aa*1. When the first digit of the desired subscriber's number has been received in the register (in a well known though not further indicated way) the incoming sequence switches in the second group of registering relays BA—BD by means of contact I*a*—I*d* to record the hundreds digit and moves the outgoing sequence switch SSU (lower right of Fig. 1*b*) from position "0" to position "1" (similar to that described for the sequence switch in said Patent 2,711,444). As a result of this, a circuit is closed for the driving magnet DM (lower right of Fig. 1*b*) of the busy test selector BZ, the circuit running from ground over contact *ssu*1/2, of the sequence switch SSU in position "1," contact *t* of test relay T; contact *y*2 of relay Y, and the windings of the driving magnet $DM_{BZ}$ to battery and ground. At the same time relay P is energized, in the circuit from ground over winding of relay P (upper left of Fig. 1*b*), contact *ssu*1/2 of the sequence switch SSU in position "1," resistance R2 to battery and ground. The first contact pyramid is switched in thereby completing the marking circuit for contact H10 of the arc *a*1 of the busy test selector BZ from grounded battery over resistance R1 (lower left of Fig. 1*a*), contact *ssu*1 of the sequence switch SSU in position "1," back contact *ac*6 of relay AC, front contact *aa*6 of relay AA, back contacts *ad*5 and *ad*4, outlet 1 of the first contact pyramid to marking contact H10 of the busy test selector BZ.

The busy test selector BZ thus leaves its home position hunting for this marked contact H10 (upper left of Fig. 1*b*). As soon as the *a*1 wiper reaches the marked contact H10, the test relay T energizes through the circuit from ground over contact *q*3, winding of relay T, and the *a*1 wiper to the marked contact H10. The busy test selector is now arrested as contact *t* (lower right of Fig. 1*b*) of relay T in the circuit for the driving magnet DM of the busy test selector BZ switches over from its back contact to the front contact, thereby preparing or completing the circuit for relay X which is slow releasing. The circuit for relay X includes besides the contacts *ssu*1/2 and *t*, the contacts *p*3 of relay P (which operates contact *a''*) and *y*1 of relay Y. Contact *a''* is not closed until the second or hundreds digit of the wanted subscriber's number has been received. Said contact *a''* is controlled by the incoming sequence switch and will only be closed if the switches I*a*—I*d* (Fig. 1*a*) have been moved for switching in the group of relays CA—CD to record the third digit. Thus, as soon as relay T has been energized for the first time, terminating the positioning of the busy test selector at a tens contact, and the second digit (which in the assumed case is "6") has been received, the relay X is operated. Relay X operates relay Y by means of its contact *x*1, and operates the sequence switch SSU by means of contact *x*2.

The energized relay Y closes its holding circuit by means of its contact *y*1 via front contact *t* of relay T, and the circuit for relay X is broken thereby, so that the sequence switch magnet SSU receives an impulse of limited duration at the end of which said sequence switch is stepped from position "1" to position "2." Contact *y*3 (upper left of Fig. 1*b*) of relay Y shunts and thereby releases relay T. Contact *y*2 of relay Y breaks the already interrupted circuit of the driving magnet DM of the busy test selector, so that upon the release of relay T the circuit of said driving magnet is not yet restored. The circuit for relay T is opened as the first contact pyramid is disconnected from the battery by contact *ssu*1.

As the second digit has been assumed to be "6," relays BB and BC will have been energized ("0110" or binary system equivalent of "6") and have closed their respective holding circuit over contacts *bb*1 and *bd*1 to the register ground through now closed contact *ra*1. The second contact pyramid of the group of relays BA—BD has now been connected to the grounded battery through resistance R1 and by means of contact *ssu*2 of the sequence switch in position "2." Over front contact *bb*2 and *bc*2 and back contact *ba*2, the outlet 6' of said contact pyramid is selected. The ten contacts of arc *a*1 of the busy test selector BZ, of which the units digit is H16, will thus be marked (only contacts H16 and H26 being shown).

Upon the release of relay X, relay Y is also released, thereby completing the circuit for the driving magnet DM of the busy test selector BZ, so that the busy test selector BZ starts hunting the first marked contact, provided however relay T is not yet energized as will be discussed later. When the wiper *a*1 of the busy test selector BZ reaches contact H16, relay T will be energized again in the circuit from ground over contact *q*3, windings of relay T, wiper *a*1 of BZ, contact H16 of the arc *a*1, terminal 6', back contact *ba*2, front contacts *bc*2 and *bb*2, sequence switch contact *ssu*2 in position "2," and resistance R1 to battery and ground. The driving magnet DM will then be released and relay X will be energized as described above for the positioning of the busy test selector BZ in accordance with the thousands digit. The same forced switching cycle which is initiated by the operation of relay X again takes place thereby energizing relay Y, releasing relay T and pulsing the sequence switch SSU to its next position "3."

If the second digit received instead of "6" had been a "0," a circuit is directly established for testing relay T in position "2" of the sequence switch SSU. As this circuit should not prevent relay T from releasing after the sequence switch has been stepped from position "1" to position "2," the winding of this relay is short-circuited by a contact *y*3 of relay Y. Consequently, when the actuation of the sequence switch has actually been carried out, i. e. when contact *t* has closed the circuit for relays X and Y and contact *x*2 of relay X has closed a circuit for the stepping magnet of the sequence switch SSU and contact *y*3 of relay Y has short-circuited relay T so that it releases and opens in turn the energizing circuit of relay Y, then relay T can be energized again without a renewed excitation of the driving magnet DM of the busy test selector BZ. If therefore, the second hundreds digit is "0," the busy test selector is already in the correct position for its first function after the first positioning, which is effected in the same way as the positioning of the normal final selectors. In this instant relay T will be energized as soon as the sequence switch has attained position "2" in the circuit: ground over contact *q*3 of relay Q windings of relay T, outlet 10' of the second contact pyramid, front contact *bd*2, back contacts *ba*3 and *bc*2, front contact *bb*2, contact *ssu*2 of the sequence switch, and resistance R1 to battery and ground. The driving magnet DM will thus in this case not be energized, but relay X will normally be operated to start the forced switching cycle in order to have the sequence switch attain its next position "3."

When the sequence switch reaches its third position "3," the marking over the second contact pyramid is taken away so that relay T will not be energized. At the same time the driving magnet DM of the busy test selector BZ is brought under the control of contact *q*2 (lower right of Fig. 1*b*) of relay Q and contact *p*2 of relay P.

Contact $p2$ stays open as the circuit for relay P is switched over through its holding contact $p1$ and contact $ssu3$ to wiper $b1$ of the busy test selector BZ, in order to test the busy condition of the numerical group of final selectors in group H16.

The $b1$ wiper of BZ has access to a group of parallel-connected break contacts of relays in the final selector circuits belonging to the hundred group indicated by the busy test selector BZ in that particular position H16. When a final selector is engaged the associated *ek*-contact is opened. If, consequently, all the final selectors in the relevant hundreds group (H16) are engaged, all the *ek*-contacts will be opened. In that case relay P releases when the sequence switch moves to position "3." If relay P remains operated in position "3" of the sequence switch $SS_u$, the cord finder KZ (not shown but connected via conductor entering lower left of Fig. 1*b*) is started in the normal way for searching a free final selector and a free connecting circuit via which this final selector can be attained. After the release of relay P, however, the cord finder cannot start, because the $p^4$-contact (right center of Fig. 1*b*) has been opened. The busy test selector is then positioned at the hundred group of the final selectors in which the called subscriber occurs by interconnecting.

*Positioning of BZ on the group of final selectors to which the relevant interconnecting group has been connected in case the numerical group of final selectors is found busy*

It is assumed that the interconnecting is done by groups of 20 subscribers' lines. The group to which the desired subscribers' line belongs, can easily be found out by means of a normal contact pyramid on the register relay CA to CD (Fig. 1*a*, left side) the outlets $1^{iv}$, $3^{iv}$, $5^{iv}$, $7^{iv}$ and $9^{iv}$ of this pyramid being commoned with outlets $2^{iv}$, $4^{iv}$, $6^{iv}$, $8^{iv}$ and $10^{iv}$ respectively. By means of the circuit shown, which may contain some rectifier cells (not shown), or by means of relays EA, EB and EC having more than one winding, a binary registration can be obtained of the number of the group of twenty circuits in the relevant hundreds group. By means of the relays CA—CD (which operate according to the third digit), relays EA—EC (which convert the digits into the binary system), and relays FA—FD (which add tens and hundreds digits) the desired number put into relays AA—AD and BA—BD is converted into the systematic shifting of groups of Table A so that the selector BZ always stops on the first selector position of the 6-groups in arrangement, and then the circuit finds which of the two groups of 20 outlet terminals in the 6-groups is free so that the busy test selector BZ can advance directly to it without reversing. This number indicates how many hundreds shifted onward the final selectors contain the interconnecting group of 20 circuits, which is in the same place though in the interconnecting part of the contact bank.

According to the type of selector used the busy test selector can be controlled by means of a number of impulses or the like. In the given example the number of the relevant group of twenty circuitss is added to the hundreds number by means of an adding circuit of relays FA—FD as indicated in Fig. 1*a* (center), which by itself is of a well-known type. The result of the addition is recorded in the relay group FA to FD. In the chosen example the sum cannot exceed 15 because relays EA—EC only count the 5-groups of 20 in each hundred, i. e. 5+10=15.

The marking of the busy test selector BZ is obtained by means of 10 wires associated with the tens contacts and a multiple of 9 wires by means of which the interjacent units contacts are marked contacts 1''–10'' and the small *ek* contacts at the left in Fig. 1*b*. Now the busy test selector BZ can be moved forward from any position by a number of positions equal to the twenties number, the 10 wires for the marking of the tens contacts being left out of consideration for the moment, if the relay group FA to FD is provided with a complete contact pyramid (lower left of Fig. 1*a*), the outlets 1'', 2'', 3'', 4'' and 5'' of which are commoned with the outlets 11'', 12'', 13'', 14'' and 15'', respectively. The difficulty is encountered then, however, that the tens contacts of the selector are unmarked. This can be remedied by connecting the tenth wire of the contact pyramid of relays FA to FD to a second contact pyramid (lower right of Fig. 1*a*) of the register relays AA to AD for the thousands digit, which second contact pyramid is connected via conductor 100 in such a way to the contacts or terminals 1–10 of the first contact pyramid on these relays AA—AD that among the marking wires for the tens contacts, always that one is marked which is, one higher in number than that originally indicated in Fig. 1*a*. Consequently, in this way the new position of the busy test selector as determined by the twenties number is marked. If by means of the summation a contact in a following tens group must be marked, the tens marking must also be moved so that a relay OR (see right center of Fig. 1*b*) must be provided as a means to initiate this in case of a forward and backward moving switch BZ to indicate which direction of motion to use. However, relay OR is not necessary in the circuits of Figs. 1*a* and 1*b*, because the first tens marking can be shifted forward over five positions, so that the first marked contact in the forward movement of BZ is the correct one.

When the busy test relay P releases indicating that no final selector in the group corresponding to contact H16 is available to complete the connection, back contact $p2$ (lower right Fig. 1*b*) closes a circuit through contacts $ssu3$, $p2$, $q2$, $t$ and $y2$ for the driving magnet DM of BZ. It is noted that the third digit "7" must have been received by this time, so that the latter circuit for the driving magnet DM of BZ should be controlled (via contact $a''$) by the incoming sequence switch which is not further indicated.

Again a contact has to be marked of the arc $a1$ of the busy test selector BZ which depends on the hundreds digit "6" and the group in which the tens digit "7" occurs. The hundreds digit has been registered by the operation of relays BB and BC, and the tens digit "7" is recorded by the energization of relays CA, CB and CC. The group number is determined by the third contact pyramid (upper left Fig. 1*a*) of the relays CA—CD to which ground is connected in position "3" of the sequence switch by means of contact $ssu3$. A circuit is thereby completed for relay EC running from ground over contact $ssu3$, front contacts $ca2$, $cc2$ and $cb2$, terminal $7^{iv}$, winding of relay EC to battery and ground, indicating that the tens digit "7" belongs to the fourth group. In the present instant the adding arrangement on relays BA—BD and EA—EC will have to add "6" to "4."

The adding arrangement has four inputs I, II, III and IV, respectively. The inputs I and II serve for indicating the odd and even numbers, input III serves for indicating the fours digit of the binary sum, and input IV for indicating the eights of the binary number. In case the sum of the hundreds digit and the group number is odd (relay BA or EA being energized), wire 21' in the center of Fig. 1*a* will be connected to ground over contacts $ea3$ and $ba6$. In case the number is even, wire 21' will also be connected to ground over back contacts $ea3$ and $ba5$ if neither relay EA nor relay BA has been energized, thus wire 21' serves as an extended input II, whereas wire 20' (just above wire 21' in Fig. 1*a*) will be connected to ground if the even sum is composed of two odd numbers, relays BA and EA being operated. If the fours digit of the binary sum is "1" and composed of two two's digits, the input III is extended over front contacts $eb2$ and $bb4$. These principles are used throughout the entire adding arrangement.

In the present case the relays BB, BC and EC are operated so that the following front contacts are engaged in the summation arrangement: *bb*3, *bb*4, *bb*5, *bc*5, *bc*6, *ec*1, *ec*2, *ec*3, *ec*4 and *ec*5. Ground will be on wire 21' over contacts *ba*5 and *ea*3 as extended input II, so that relay FB will be energized as contact *bb*3 is moved over to connect said relay FB to said grounded wire 21'. Relay FD will also be energized in the circuit from ground over input IV, front contact *ec*2, back contact *bd*5, front contact *bc*6, winding of relay FD to battery and ground. These relays will thus close a circuit in the fourth contact pyramid (of the relays FA—FD) from ground and battery over resistance R1, close contact *ssu*3 of the sequence switch in position "3," front contacts *fd*1 and *fb*1, back contacts *fc*1 and *fa*1 to outlet 10'' of this pyramid and then to wire 100. It is thus seen that not one of the units marking wires is energized which are also connected to the outlets of the second contact pyramid (of relays BA—BD), but that the tens digit of the busy test selector is involved. Wire 100 gives access to the additional fifth contact pyramid which is like the first contact pyramid arranged to be controlled by the relays AA—AD. As the thousands digit is "1," outlet 1''' is energized over contacts *ab*2, *aa*3, *ad*3 and *ac*4, this outlet being connected to the outlet 2 of the first contact pyramid, so that the tens contact H20 of the arc *a*1 of the busy test selector BZ at left of Fig. 1*b* now is marked.

The busy test selector BZ now moves on to the marked contact H20, at which the test relay T responds and opens the circuit for the driving magnet DM of BZ at contact *t*, thereby closing a circuit for relay Q over back contacts *p*3. Relay Q then closes its holding circuit through its contact *q*1 and register ground contact *ra*2. At open contact *q*2 the driving magnet DM of BZ is prevented from energizing before the release of the register, while at open contact *q*3 the circuit for relay T is interrupted, and by means of contact *q*4 a circuit is closed for the busy test, by means relay S (upper left of Fig. 1*b*), of the group of final selectors in which the interconnecting group occurs. In case there is or are final selectors available in the group, relay S operates.

It closes by means of contact $s^1$ (right center of Fig. 1*b*) the starting circuit for the cord finder KZ, which searches a free final selector and a free cord circuit between which a connection can be established. After this the initial selector BK (not indicated in Fig. 1) is moved to the same position as is occupied by the busy test selector BZ. This can be done by having the initial selector find back the position of the busy test selector, or in any other way which is suitable for the system or the selector construction employed. As this matter does not belong to this invention a description of it is omitted here, but such is described in Oberman's copending prior application Serial No. 230,277 together with the disclosure of Patent No. 2,711,444.

If difficulties are encountered in locating the interconnecting groups in final selectors for increasingly distant hundreds groups of the normal numbering scheme, difficulties which can arise from installation requirements, it is also possible to locate the interconnecting groups in a closed group of hundreds. An interconnecting by groups of 20 subscribers e. g. could be contained in a group of 600 subscribers, an interconnecting by groups of 25 subscribers in a group of 500 subscribers, etc. This means, however, that an interconnecting group can be placed in a hundreds group having a lower number than the hundreds group in which the relevant subscribers can be found normally. In that case the busy test selector BZ of the register should preferably have two directions of motion (there and back) (the *n* relay OR is necessary) or it should be made to stop at the first hundreds group of *n* interconnected hundreds groups; next, by other means (well-known in switching engineering) a test should be carried out to see, whether there are free final selectors available among those allotted to the hundreds group in which the desired subscriber's line occurs according to the normal numbering scheme as well as among those in which it occurs by interconnecting, after which a free final selector can be reserved and the further control of the busy test selector be effected accordingly. The way in which the location of a subscriber's line by interconnecting is determined will be explained by means of the diagram shown in Fig. 2, in which interconnecting groups of 25 subscribers' lines are employed in a closed group of 500 subscribers' lines. The interconnecting groups of 25 subscribers' lines are arranged by cyclic shift according to Table B above in their five hundred group. For simplicity's sake the busy test selector has been arranged as a crossbar selector BZ' having 10 horizontal and 10 vertical magnets designated by H and V, respectively. Any type of selector having a sufficient number of contacts is suitable for the purpose.

Fig. 2 shows 4 groups of register relays AA to DD in which the received digits of the desired number are recorded in some way or other, e. g. binarily. A registration in decimal marking switches however, can readily be arranged. The register relays AA to AD are provided with a pyramid of contacts, which deliver a decimal translation of the binary registration code. The numerical outlets of this pyramid are connected to the correspondingly numbered horizontal magnet of the crossbar switch which serves as busy test selector BZ'.

The group of register relays BA to BD, in which the second digit is recorded, is also provided with a contact pyramid having ten outlets, the outlets 1, 2, 3, 4 and 5 of which are commoned with the outlets 6, 7, 8, 9 and 10, respectively, in order to achieve in an installation to be described later. A considerable economy of contacts also is obtained, so that the contact pyramid has 5 outlets conductors. These five conductors lead to a combination of contacts of relays $C_1$, $C_2$, $C_4$. They leave this combination in the same numerical order, if the relays $C_1$, $C_2$ and $C_4$ are not energized. Thereupon the five conductors are split up again, by means of contacts of relay OR' into 10 conductors 1–10, which correspond to the original ten outlet conductors of the contact pyramid. The contacts $bb^5$, $bc^5$ and $bd^5$ are connected in such a way that they close an energizing circuit for relay OR' if the digit recorded in the relay group BA to BD is higher than 5. The ten outlet leads are run to the ten vertical magnets $V_1$–$V_{10}$ of the crossbar switch BZ'. After the energization of the relevant vertical magnet the energizing circuit of the horizontal magnet $H_1$–$H_{10}$ may be interrupted again, so that the sequence switch contact UA is not opened until one of the relays V has closed a holding circuit. The contacts of the actuated crossing of the crossbar selector BZ' give a testing device, which is not shown but is of a well-known type, access to a wire via which the desired final selector group can be tested as to its total occupation, which is expressed in a numerical indication. Consequently, such a device may e. g. be arranged as indicated for the *b'*-wiper of the busy test selector in Fig. 1. If this device finds that the desired subscriber's line is not obtainable by the numerical path, the busy test selector must be re-positioned in such a way that the final selector group can be tested in which the desired subscriber's line occurs by interconnecting after shifting from the original position.

Therefore, in this instance, the twenty-five group in which the called subscriber's line occurs should be determined first, or, generally speaking, the number of the group of interconnecting outlets and, consequently, the number of hundreds which, in the interconnected hundreds groups, the selector must be moved further in order to give access to the desired group of interconnecting outlets.

The number of the group of interconnecting outlets is recorded binarily in the relays $C_1$, $C_2$ and $C_4$ by means of contacts of relays CA to CD and the contacts $db^2$, $dc^2$ and $dd^2$ of the group of register relays DA to DD, in which the units digit is recorded, as well as with the aid of auxiliary relay OS. A binary registration is not necessary, but allows the greatest simplicity of circuit arrangement. The contacts $c_1^1$ to $c_1^5$, $c_2^1$ to $c_2^5$, and $c_4^1$ to $c_4^5$ effect, in the circuit according to Fig. 2 a cyclic shift of the marking provided by the contact pyramid on relays BA to BD in accordance with the number of the interconnecting group, so that in case the busy test selector is re-positioned, it is moved to the hundreds group with which, in the final selector, the desired group of interconnecting outlets is associated. It is observed here, via contacts $OS^1$ and $OS^2$, that 25 and 75 occur in the third and in the eighth decade, respectively, so that relay OS must ensure the distribution.

If the second digit received is a 0, a circuit is established for testing relay T in position 2 of the sequence switch (as indicated in Fig. 1). As this circuit must not prevent relay T from releasing after the sequence switch has been moved from position 1 to position 2, the winding of this relay is short-circuited by a contact $y^3$. Consequently, when the actuation of the sequence switch has actually been carried out, i. e. when contact $t$ has closed the circuit for relays X and Y, contact $x^2$ closing a circuit for the driving magnet $SS_v$ of the sequence switch and contact $y^3$ having short-circuited relay T, so that it releases and opens in turn the energizing circuit of relay Y, relay T can be energized again without a renewed excitation of the driving magnet $DM_{bz}$ of the busy test selector BZ. If, therefore, the hundreds digit is a 0 the busy test selector is already in the correct position for its first function after the first positioning, which is effected in the same way as the positioning of normal final selectors.

As groups of 25 subscribers' lines have been chosen and consequently, the interconnecting affects 500 circuits, the described example is very simple. When groups of 20 subscribers' lines are used, the cyclic permutation is contained in a group of six hundred circuits. With an adequate registration of the first two digits (of a four digit number) in the binary system, the arrangement for the cyclic shift can in principle be left unchanged. This arrangement for cyclic shift may also be embodied in a small rotary switch having a number of positions which exceeds by one the number of groups of interconnecting outlets per hundred, and an equal number of wipers. This is shown symbolically in Fig. 3. The closed interconnecting group of $N+1$ hundreds is only applicable, if a device is provided which is capable of refinding, by cyclic shift, where the desired outlet appears by interconnecting.

While I have illustrated and described what I regard to be the preferred embodiment of my invention, nevertheless it will be understood that such is merely exemplary and that numerous modifications and rearrangements may be made therein without departing from the essence of the invention, I claim, 1. In a switching system having a plurality of final selector switches each with a plurality of outlet terminals, and a plurality of outlet circuits connected thereto, a system for increasing the traffic through a given number of final selector switches to said outlet circuits comprising: a plurality of selector switches with each switch having one portion of its outlet terminals arranged in order according to one system, and another portion of its outlet terminals arranged in order according to another system, with each different outlet circuit being connected to an outlet terminal in each system but the two outlet terminals for said one circuit in said different system being located on different selector switches, means for selecting a desired outlet circuit through one of said two corresponding selector switches including: means for selecting a free selector switch having one of said two outlet terminals of said desired circuit, and means for positioning said selected free selector switch to connect with said one outlet terminal of said desired outlet circuit.

2. A system according to claim 1 wherein each said portion is divided into parts and said parts of one portion corresponding to the parts of the other portion are distributed among that one portion of the other selector switches.

3. A system according to claim 2 wherein the order of said distributed parts is arranged in cyclic permutation among a group of other selector switches equal in number to one plus the number of parts each section is divided into.

4. An automatic switching system having a plurality of final selector switches each with a plurality of outlets, and a plurality of outlet circuits, corresponding to signal elements arranged according to one system, each of said selector switches having a bank of outlet contacts divided into two sections, one section containing contacts arranged in an order according to said one system and the other section containing contacts arranged in an order according to another system but mixed throughout each switch with respect to said contacts of said one system, said outlet circuit corresponding to said different elements being multipled to corresponding outlet circuits in each system on two different selector switches, and means for selecting one of said selector switches to be connected to a given outlet comprising: means for storing the elements of said one system corresponding to said outlet circuit, means for converting said stored elements to correspond to said other system, and means for operating said selecting means according to the corresponding elements in both said systems to find a free selector switch which can be connected to said given outlet circuit.

5. A system according to claim 4 wherein said elements are digits of a number and said systems are numerical systems.

6. A system according to claim 4 wherein said means for storing comprises a register circuit.

7. A system according to claim 4 wherein said final selector switches are divided into groups and said two systems of arrangement of the outlet contacts are mixed only within each group.

8. A system according to claim 7 wherein each section of each selector switch is divided into parts and the parts of one arranged system are distributed among the different selector switches from the corresponding parts of the other arranged system.

9. A system according to claim 8 wherein the number of selector switches in each group is one more than the number of said parts a said section is divided into.

10. A system according to claim 8 wherein said distribution is in a cyclic permutation arrangement.

11. A system according to claim 10 wherein said cyclic arrangement is effected by means of a rotary switch.

12. In an automatic switching system having a plurality of outlet circuits and being responsive to a series of dial impulses for selecting a given outlet circuit of said system through a plurality of groups of final selectors, the improvement comprising: two sets of outlet terminals for each final selector, one set being arranged in one numerical order corresponding to said impulses within a group of said final selectors, and the other set being arranged in another numerical order in the same said group of final selectors, each outlet circuit being connected to an outlet terminal in to each numerical system in its corresponding group, and means for selecting a given outlet circuit in said same group, comprising: means for converting the impulses corresponding to said outlet circuit into both said numerical systems, a testing switch means to be connected to said outlet circuit, means to position said testing switch means according to both said converted and unconverted impulses to select the first free final selector which can be connected to said circuit in said group.

No references cited.